Jan. 11, 1955   J. J. ROBINSON, JR   2,699,112
SHELF IMPRINTING DEVICE WITH ADJUSTABLE GUIDE
Filed Feb. 15, 1951   2 Sheets-Sheet 1

Inventor
Joseph J. Robinson, Jr.
By Fraser, Bishop & Hamilton
Attorneys

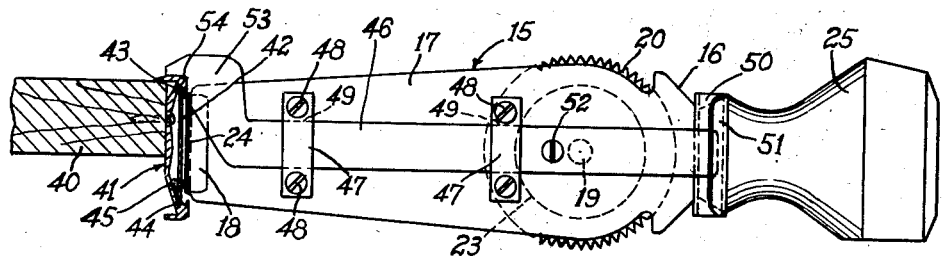
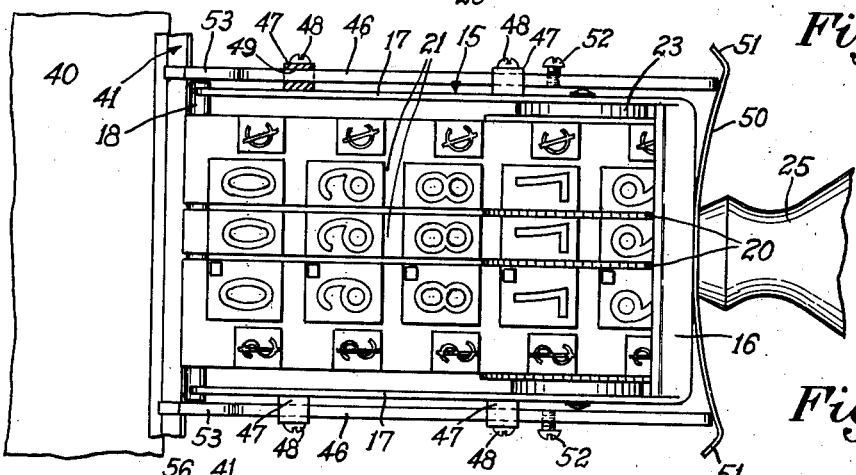
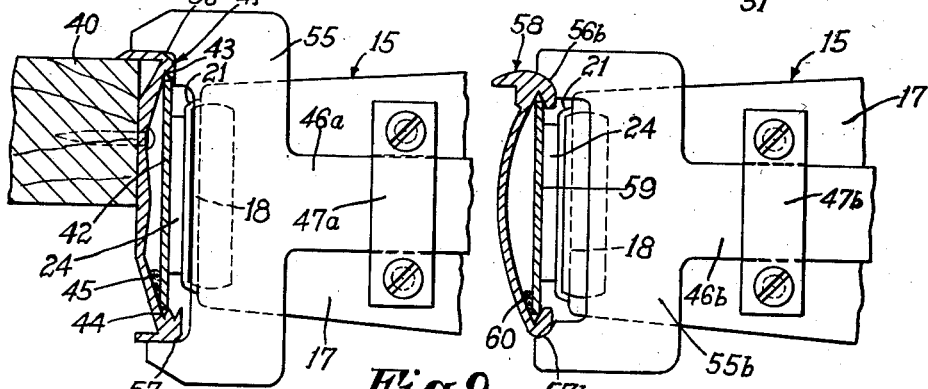
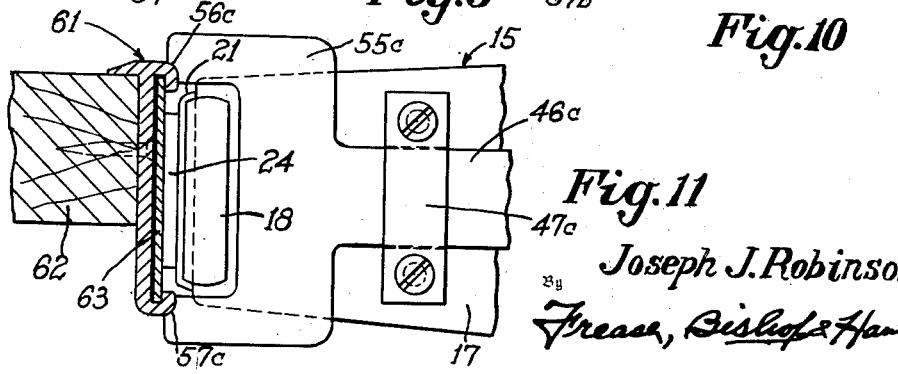

United States Patent Office 2,699,112
Patented Jan. 11, 1955

2,699,112

SHELF IMPRINTING DEVICE WITH ADJUSTABLE GUIDE

Joseph J. Robinson, Jr., New Philadelphia, Ohio, assignor to Marsh Wall Products, Inc., Dover, Ohio, a corporation of Ohio Application February 15, 1951, Serial No. 211,091

6 Claims. (Cl. 101—111)

The invention relates to the marking of prices of goods displayed for sale upon shelves in super markets, self serve stores, and the like, and the present application is an improvement upon the copending application of Donald S. Stewart for Shelf Imprinting Device, Serial No. 41,242, filed July 29, 1948, now abandoned.

It has long been customary practice in such stores, or markets, to mark the prices of the goods displayed upon the shelves by attaching strips of grooved or channel molding to the edges of the shelves and fitting removable price tags, in the form of small cards or slips of cardboard, sheet plastic, or similar material, bearing the price markings, into or upon the front faces of the molding strips.

While this is the method which is in general use, of pricing the goods upon the shelves, it has not proven entirely satisfactory for several reasons. The attaching of the price tags to the molding is a time-consuming operation and since fluctuation in the prices of the goods requires frequent repricing of at least a large proportion of the goods, considerable labor is required to maintain such a method of pricing the goods.

Furthermore, it is necessary to keep a large supply of the price tags on hand, and since these price tags are relatively costly this results in a non-productive job inherent in marketing, which is both burdensome and expensive.

Owing to the fact that these removable price tags can be picked off of the molding, and that they become broken, bent, or often lost, due to continual changing and rearranging of the same, as prices fluctuate, added labor and expense is involved in replacing the price tags.

Another objection to this method of price marking is that, because in many cases the removable price tags are not held firmly in place on the molding, considerable annoyance and trouble to the merchants and clerks is caused by the price tags being accidentally or intentionally moved by unauthorized persons, from one place to another upon the molding, so as to erroneously indicate the price of the goods upon the selves.

Furthermore, great confusion and annoyance is frequently caused by children mischievously changing the positions of many, or all, of the price tags upon the molding, or entirely removing them therefrom so that they become lost or damaged.

Because of the great variety of price markings and indicia required for adequately marking all of the goods in the average super market, or store, and the excessive demand at certain times for particular price markings or indicia, it is also difficult to maintain a sufficient supply of price tags bearing all price markings or designations thereon, without requiring an excessively large inventory of these price tags, thus causing considerable additional expense in order to properly maintain the conventional system of price marking in a single store or market, which expense is multiplied many times in the operation of a large chain of stores or markets.

It is also customary to provide costly carts and containers for transporting the conventional price tags throughout the store, when marking the prices of the goods, resulting in additional expense to maintain such a system of price marking.

In the above-referred to Stewart application, the guide or positioning means, is shown as being an integral part of the stamp imprinting device, or as a detachable member which, when operatively connected to the stamp imprinting device, is rigidly held in a fixed position relative to the stamp imprinting device.

It has been found in practice that there are certain places where the stamping device is used where an adjustable guide means provides for desirable and convenient manipulation of the stamping device, to imprint price markings upon the edges of shelves and the like.

The present invention therefore contemplates the provision of shelf imprinting device having adjustable guide means thereon, which may be quickly and easily adjusted for varied uses of the device, in printing price markings upon the edges of shelves, and the like, in markets, or stores, such as above referred to.

It is also an object of the invention to provide such a stamper having adjustable guide means, which may be quickly and readily adjusted to various positions, to accommodate varying conditions, so as to facilitate the use of the stamping device in stamping price markings throughout a market or store.

It has also been found, by actual experience, that, although a special shelf molding with insert strip for receiving the price markings, is shown in said copending Stewart application, that, many conventional types of price tag molding, with which a great majority of super markets, self serve stores, and the like, are equipped, may be left in place upon the edges of the shelves, and insert strips, to receive the price markings of the stamping device, may be inserted into said conventional shelf molding, in place of the price tags commonly used with such molding.

The invention therefore contemplates the provision of a price marking stamping device having guide means which will cooperate with such old type of shelf molding, for properly guiding and positioning the stamping device while the price markings are made thereby.

A further object of the invention is to provide an automatically adjustable guide means, upon such a stamping device, whereby the guide means may be engaged with, i. e. engageable with, the shelf molding and then permit relative movement of the stamping device to imprint price markings upon the insert strip carried by such shelf molding.

The above objects together with others which will be apparent from the drawings and following description, or which may be later referred to, may be attained by carrying out the invention in the manner hereinafter described in detail and illustrated in the accompanying drawings, in which.

Figure 1:
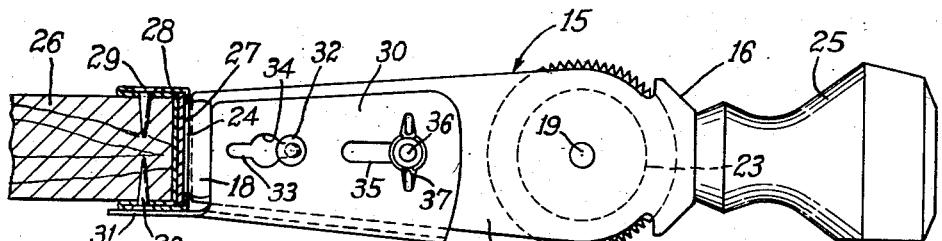
Figure 1 is a side elevation of a stamping device, with adjustable guide means thereon, showing the same positioned in marking relation to a shelf with shelf molding having an insert strip thereon to receive the ink markings.
Figure 2:
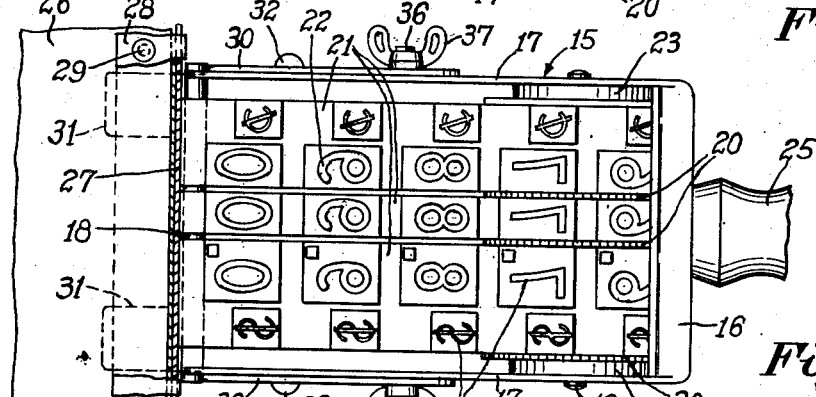
Fig. 2 is a top plan view of the stamp imprinting device shown in Fig. 1, and the front edge portion of the shelf, in the relative position shown in Fig. 1, parts being broken away for the purpose of illustration.
Figure 3:
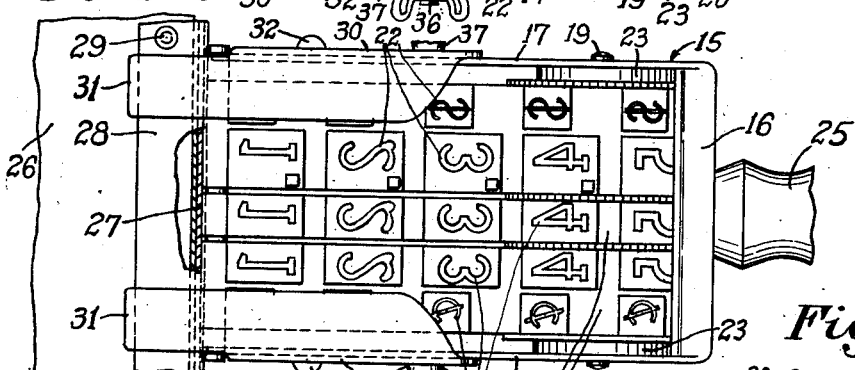
Fig. 3 is a bottom plan view of the stamp imprinting device, and front edge portion of the shelf, in the same relative position as shown in Figs. 1 and 2, with parts broken away for the purpose of illustration.
Figure 5:
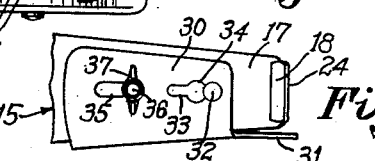
Figure 6:
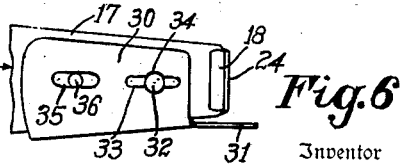
Figure 4:
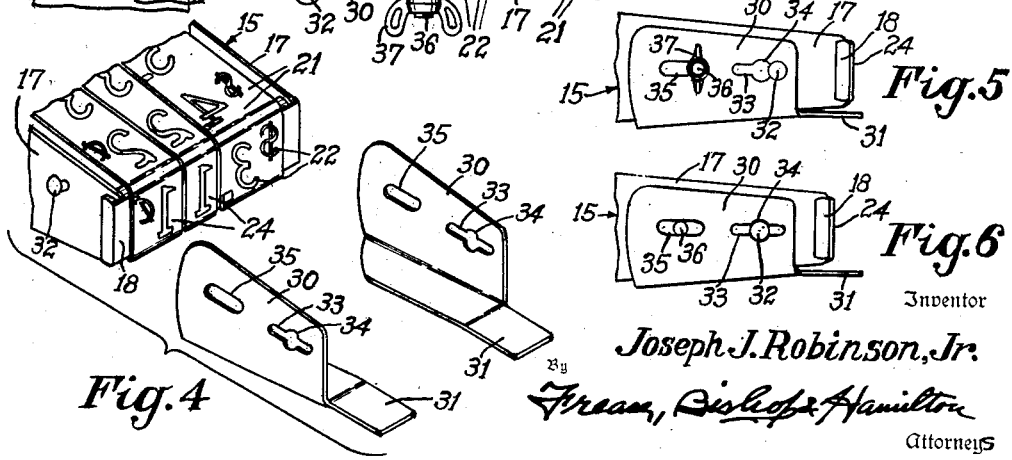

Fig. 4 a fragmentary, perspective view of the front edge portion of the stamp imprinting device shown in Figs. 1 to 3, with the adjustable guide means detachable therefrom;

Fig. 5 a fragmentary, edge elevation of the front portion of the stamp imprinting device with the adjustable guide means shown adjusted to the rearward position;

Fig. 6 a similar view with the adjustable guide means adjusted to the position where it may be detached from the stamp imprinting device;

Fig. 7 a side elevation of a stamp imprinting device with modified form of automatic adjustable guide means, shown as being used in connection with a price tag molding of the type shown in Graff and Robinson Patent No. 2,489,089, dated November 27, 1949, and provided with a suitable insert strip therein for receiving price markings;

Fig. 8 a top view of the stamp imprinting device with adjustable guide means thereon, such as shown in Fig. 7;

Fig. 9 a fragmentary, side elevation of the front end portion of a stamp imprinting device, with a modified form of automatic adjustable guide means thereon, on a larger scale, showing the same in use in connection with a price tag molding, such as the Graff and Robinson patent above referred to, with insert strip thereon;

Fig. 10 a similar view showing another form of automatic, adjustable guide means, especially adapted for use in connection with another common form of price tag molding which is provided with an insert strip instead of the usual price tags; and, Fig. 11 a similar view showing a slightly different form of automatic, adjustable guide means upon the stamp imprinting device, the same being shown in use upon another form of price tag molding in which a suitable insert strip has been substituted for the price tags.

Referring first more especially to the embodiment of the invention illustrated in Figs. 1 to 6 of the drawings, in which similar numerals refer to similar parts throughout, the stamp imprinting device, indicated generally at 15, is shown as comprising the back plate 16, side plates 17 extending forwardly therefrom, and face plate 18, connecting the extended ends of the side plates 17, at a point remote from the back plate 16.

At a point spaced from the back plate, a rod, or shaft, 19 is carried by the side plates 17, and extends therebetween, forming the axis for the hand wheels 20, which control and operate the belts 21, of rubber or the like, which carry the various price markings, or indicia, 22.

The belts 21 are wrapped around drums, as indicated at 23, attached to the hand wheels 20, and are stretched around the face plate 18, as indicated at 24, and are of the endless variety so that the price markings, or indicia, 22 thereon can be manually positioned at the face plate 18, by manipulation of the hand wheels 20.

A handle 25 is centrally connected to the back plate 16, and extends perpendicular therefrom, providing means for manually handling and operating the stamper 15 when the same is being used.

The front edge portion of a conventional shelf, such as used in super markets, self serve stores, and the like, is indicated at 26 in Figs. 1, 2 and 3, and for the purpose of receiving price markings from the stamp imprinting device 15, this shelf is provided at its front edge with a surface having the property of receiving and holding ink markings, without absorbing any appreciable quantity of the ink, whereby price markings stamped upon said surface with a soluble ink may be erased or eradicated only by the use of a solvent in which the ink is readily soluble.

This surface is indicated in the drawings as being in the form of an insert strip 27, of any suitable material, such as a smooth, or polished, stainless steel, or aluminum surface, enamelled, or porcelain surface, or a suitable plastic material, the insert strip being carried by the molding, indicated generally at 28, which is attached to the front edge of the shelf 26, as by nails or the like indicated at 29.

For the purpose of illustration the molding and insert strip are shown as being of the same construction and arrangement as disclosed in said above referred to Stewart application, but it should be understood that the stamp imprinting device, with adjustable guide, illustrated in Figs. 1 to 6 of the drawings, may be used with other forms of molding and insert strips.

The adjustable guide, or positioning means, shown in Figs. 1 to 6, is in the form of a detachable structure, adapted to be detachably connected to the front portion of the stamp imprinting device 15 and arranged to be manually adjusted thereon.

This guide, or positioning means, comprises a pair of auxiliary side plates 30 adapted to be adjustably connected to the side plates 17 of the stamp imprinting device, as will be later described in detail, and having at their lower edges the angular, forwardly disposed guide lugs, or flanges, 31.

Each of the auxiliary side plates 30 is attached to the corresponding side plate 17, of the stamp imprinting device 15, by means of a headed stud 32 rigidly mounted upon the side plates 17 and received in the elongated, longitudinal slot 33 in the auxiliary side plate 30, said slot having a central enlargement 34 of a size to receive the head of the stud 32.

For the purpose of holding each auxiliary side plate 30 in adjusted position upon the stamp imprinting device, a second elongated, longitudinally disposed slot 35 is formed in each auxiliary side plate 30 and receives the threaded stud 36, rigidly mounted upon each side plate 17 of the stamping imprinting device, the nut 37 being provided upon said threaded stud for locking the auxiliary side plate 30 in adjusted position.

As shown in Figs. 1 to 3, the auxiliary side plates 30 are adjusted to the forward extreme, and the wing nut 37 is tightened upon the threaded stud 36, holding the guide means in this position with the guide flanges or lugs 31 thereof extending a considerable distance forwardly from the face plate 18 of the stamp imprinting device, so as to provide suitable guide or positioning means for positioning the stamp imprinting device, with the type or indicia located over the face plate, as indicated at 24, in suitable position to imprint price markings upon the insert strip 27, as indicated in Figs. 1 to 3.

There are some places where such a stamp imprinting device has to be used in markets, or stores such as above referred to, such as for price marking dairy cases and the like, where it is not practical to have the guide means adjusted as shown in Figs. 1 to 3.

In such cases the thumb nuts 37 are loosened, and each auxiliary side plate 30 is slidably moved rearwardly upon the stamp imprinting device until the forward end of the slot 35 engages the threaded stud 37 and the forward end of the slot 33 engages the headed stud 32, as shown in Fig. 5.

The wing nuts 37 are then tightened, holding the guide means in this adjusted position, with the guide flanges or lugs 31 thereof extending only a short distance forwardly beyond the vertical plane of the face plate and portion 24 of the type belts, as indicated in Fig. 5.

While it may be possible for a person to use a stamp imprinting device of the general character of the device indicated generally at 15, without employing a guide or positioning means, it has been found in practice that it is not possible to uniformly align the price markings upon the insert strip or other surface at the edge of the shelf for receiving the price markings.

In order to provide for speed and accuracy in the use of such a stamp imprinting device, it has been found that guide or positioning means is necessary so that readily legible markings may be placed upon the edges of the shelves.

Although shelf imprinting devices with guide means thereon, such as shown in said copending Stewart application above referred to, have only been on the market, and offered to the trade, for less than three months, they have already been installed in a large number of super markets and stores, and one of the largest chain grocery companies in the country is contemplating changing over all of its super markets and stores from the old type price tag molding and removable price tags, to this means of price marking goods in its stores.

In order to eliminate the great expense of tearing out and discarding all of the old type price tag molding from these stores, and replacing them with molding having insert strips therein for receiving the price markings, as disclosed in said Stewart application and indicated at 28—27 in Figs. 1 to 3 of the drawings in this application, applicant has designed a means of permanently mounting suitable insert strips in such old type price tag molding and has designed automatically adjustable guide means for the stamp imprinting device, especially adapted for use with such old type shelf molding, although such automatically adjustable guide means may be used upon other types of molding than those hereinafter disclosed.

Referring first to Figs. 7, 8 and 9 of the drawings, the shelf 40 is shown with a price tage molding, indicated generally at 41, connected to the front edge thereof, this price tag molding being the type of molding disclosed in Graff and Robinson Patent No. 2,489,089, of November 22, 1949.

The majority of super markets, self serve stores and the like, are at present equipped with this particular type of price tag molding. In order to use this price tag molding, in connection with the stamp imprinting device such as indicated generally at 15, the removable price tags are all removed therefrom and an insert strip 42, of any suitable material, such as above described, is inserted into the upper and lower grooves 43 and 44 respectively of the molding 41, and permanently connected thereto by a cord of adhesive material, as indicated at 45. Such adhesive material is obtainable upon the market at present and has been found in use to securely hold the insert strip 42 in the molding 41.

Referring now more particularly to the type of automatically adjustable guide means shown in Figs. 7 and 8, this guide means is applied to a stamp imprinting device, indicated generally at 15, which is of the same construction as shown in Figs. 1 to 3, and the same reference numerals are applied to the various parts thereof as are used in Figs. 1 to 3.

The automatically adjustable guide means shown in these two figures includes a pair of longitudinally disposed bars 46, slidably mounted upon the side plates 17 of the stamp imprinting device, by means of the keepers 47 which are detachably connected to the side plates, as by screws 48, said keepers having slots 49 through which the bars 46 are slidably located.

A leaf spring 50 is connected to the central portion of the back plate 16, as by the handle or knob 25, opposite ends of said leaf spring being forwardly bent as at 51 and contacting the rear ends of the longitudinally slidable rods 46, tending to urge said rods forwardly relative to the stamp imprinting device.

Stop means, such as a screw 52, is carried by each rod 46 for contact with the rearmost keeper 47 in order to limit the forward movement of the rods 46 relative to the stamp imprinting device 15.

At the forward end of each rod 46 is formed an upwardly and forwardly disposed, angular extension 53, having the angular cutout portion 54 adapted to engage over the upper edge of the shelf molding 41, to position the stamp imprinting device relative to the insert strip 42 in said molding.

It should be understood that in the normal position of the parts, the leaf spring 50 urges the slidable bars 46 forward to the point where the stop screws 52, upon the bars, contact the rearmost keepers 47. In this position the forwardly and upwardly disposed guide projection 53 of each bar will be positioned at a point forwardly from the face plate 18 and imprinting portion 24 of the belts.

In this position the angular notches 54 of the guide members are engaged with the upper edge of the molding 41 and as the stamp imprinting device 15 is pushed forwardly, into printing contact with the surface of the insert strip 42 the sliding rods 46 will have moved backward relative to the stamp imprinting device 15 to the position shown in Figs. 7 and 8.

In Fig. 9 the construction is the same as illustrated and described relative to Figs. 7 and 8 with the exception that the sliding bars 46a which are located through the keepers 47a are provided with a different guide means at their forward ends. This guide means comprises the vertically disposed T-head 55, having the angular cutout upper corner 56 to engage the upper edge of the shelf molding 41 and the angular cutout lower corner 57 to engage the lower edge of the molding. Otherwise the operation is the same as described with reference to Figs. 7 and 8.

In Fig. 10 is shown another common type of price tag molding, indicated generally at 58, to which an insert strip 59 is attached as by the adhesive 60. The stamp imprinting device 15 may be the same as above illustrated and described in detail and the longitudinally slidable bars 46b are slidably attached to the side plates 17 of the stamp imprinting device as by the keepers 47b.

A vertically disposed T-head 55b is formed at the forward end of each bar, provided at its upper and lower end portions with the cutouts 56b and 57b for engagement with the upper and lower edges of the shelf molding 58.

In Fig. 11 is shown another common form of shelf molding, indicated generally at 61, which is attached to the front edge of the shelf 62 and has an insert strip 63 of any suitable material located therein. The stamp imprinting device, indicated generally at 15, is of the same construction as above described, and the longitudinally slidable bars 46c are located through the keepers 47c and operated in the same manner as above illustrated and described in detail with reference to Figs. 7 and 8.

The vertical T-head 55c is formed at the forward end of each bar 46c, and has the upper and lower notches 56c and 57c respectively for engagement with the upper and lower edges of the shelf molding 61.

From the above it will be obvious that adjustable guide means is provided upon the stamp imprinting device for adapting the same to use upon various types of shelf molding.

According to the provisions of the patent statutes, I have explained the principle of my invention and described certain preferred embodiments thereof, but I desire to have it understood that within the scope of the appended claims the invention may be practiced otherwise than as specifically illustrated and described, the invention residing in the provision of adjustable guide means for engagement over one or both edges of a shelf molding, or the like, having a suitable surface thereon for receiving price markings.

I claim:

1. In a marking stamper comprising a back plate, side plates leading from said back plate, a face plate connecting the extended ends of the side plates, marking means overlying said face plate, a handle upon the back plate, guide means extending from said side plates in parallel planes perpendicular to the plane of the face plate, the front edges of the guide means being engageable with the surface to be marked and having offset extensions projecting beyond said object to be marked and adapted to be positioned against the side of said object, and means mounting said guide means for longitudinally slidable movement upon said side plates.

2. In a marking stamper comprising a back plate, side plates leading from said back plate, a face plate connecting the extended ends of the side plates, marking means overlying said face plate, a handle upon the back plate, guide means extending from said side plates in parallel planes perpendicular to the plane of the face plate, the front edges of the guide means being engageable with the surface to be marked and having offset extensions projecting beyond said edges and adapted to be positioned against the side of said object to be marked, means mounting said guide means for longitudinal slidable movement upon said side plates, and spring means for automatically adjusting said guide means.

3. In a marking stamper comprising a back plate, side plates leading from said back plate, a face plate connecting the extended ends of the side plates, marking means overlying said face plate, a handle upon the back plate, a longitudinal bar on each side of the marking stamper extending in a plane perpendicular to the plane of the face plate, the front edges of the longitudinal bars being engageable with the surface to be marked and having offset extensions projecting beyond said edges and adapted to be positioned against the side of said object to be marked, and means slidably mounting said bars on the side plates.

4. In a marking stamper comprising a back plate, side plates leading from said back plate, a face plate connecting the extended ends of the side plates, marking means overlying said face plate, a handle upon the back plate, a longitudinal bar on each side of the marking stamper extending in a plane perpendicular to the plane of the face plate, the front edges of the longitudinal bars being engageable with the surface to be marked and having offset extensions projecting beyond said edges and adapted to be positioned against the side of said object to be marked, means slidably mounting said bars on the side plates, and resilient means normally urging said bars forwardly relative to the marking stamper.

5. In a marking stamper comprising a back plate, side plates leading from said back plate, a face plate connecting the extended ends of the side plates, marking means overlying said face plate, a handle upon the back plate, a longitudinal bar on each side of the marking stamper extending in a plane perpendicular to the plane of the face plate, the front edges of each longitudinal bar being engageable with the surface to be marked and having offset extensions projecting beyond said edges and adapted to be positioned against the side of said object to be marked, means slidably mounting said bars on the side plates, and spring means normally urging said bars forwardly relative to the marking stamper.

6. In a marking stamper comprising a back plate, side plates leading from said back plate, a face plate connecting the extended ends of the side plates, marking means overlying said face plate, a handle upon the back plate, a longitudinal bar on each side of the marking stamper extending in a plane perpendicular to the plane of the face plate, the front edges of the bars comprising T-head extensions engageable with the surface to be marked and having offset extensions extending beyond said edges and adapted to be positioned against the side of said object to be marked, means slidably mounting said bars on the side plates, and means normally urging said bars forwardly relative to the marking stamper.

References Cited in the file of this patent

UNITED STATES PATENTS

| | | |
|---|---|---|
| 411,158 | Luebben | Sept. 17, 1889 |
| 418,236 | Schulze-Berge | Dec. 31, 1889 |
| 667,589 | Silverman | Feb. 5, 1901 |
| 1,457,697 | Force | June 5, 1923 |
| 2,079,080 | Melind | May 4, 1937 |
| 2,314,828 | Humphries | Mar. 23, 1943 |
| 2,451,595 | Wheeler | Oct. 19, 1948 |

FOREIGN PATENTS

| | | |
|---|---|---|
| 10,835 | Norway | June 16, 1902 |
| 253,050 | Great Britain | June 10, 1926 |